(12) United States Patent
Wansink

(10) Patent No.: US 9,949,584 B2
(45) Date of Patent: Apr. 24, 2018

(54) FOOD PRESENTATION METHODS

(71) Applicant: Brian Wansink, Ithaca, NY (US)

(72) Inventor: Brian Wansink, Ithaca, NY (US)

(73) Assignee: Transformative Health Solutions, LLC, Ithaca, NY (US)

( * ) Notice: Subject to any disclaimer, the term of this patent is extended or adjusted under 35 U.S.C. 154(b) by 0 days.

(21) Appl. No.: 14/863,429

(22) Filed: Sep. 23, 2015

(65) Prior Publication Data

US 2017/0079451 A1    Mar. 23, 2017

(51) Int. Cl.
| | |
|---|---|
| *A47G 19/02* | (2006.01) |
| *B65D 21/02* | (2006.01) |
| *B65D 1/36* | (2006.01) |
| *B65B 5/06* | (2006.01) |
| *B65B 25/00* | (2006.01) |
| *G09B 19/00* | (2006.01) |
| *A47G 23/06* | (2006.01) |

(52) U.S. Cl.
CPC ............ *A47G 19/025* (2013.01); *B65B 5/068* (2013.01); *B65B 25/00* (2013.01); *B65D 1/36* (2013.01); *G09B 19/0092* (2013.01); *A47G 23/06* (2013.01); *Y02W 90/11* (2015.05)

(58) Field of Classification Search
CPC .... B65D 1/36; B65D 21/0209; A47G 19/025; B65B 5/068; B65B 25/00; G09B 19/0092
USPC ............ 53/474; 426/115, 119–120; 206/557, 206/558, 561, 562, 563, 564, 541; 434/127; 220/500, 507, 553
See application file for complete search history.

(56) References Cited

U.S. PATENT DOCUMENTS

| | | | | | |
|---|---|---|---|---|---|
| 3,532,247 | A | * | 10/1970 | Bridges | B65D 81/3834 206/217 |
| 3,608,770 | A | * | 9/1971 | Naimoli | B65D 1/36 206/545 |
| 3,656,681 | A | * | 4/1972 | Goings | B65D 1/36 206/546 |
| 3,799,386 | A | * | 3/1974 | Madalin | B65D 25/2897 206/564 |
| 3,845,875 | A | * | 11/1974 | Douglas | B65D 1/36 206/509 |
| 3,938,688 | A | * | 2/1976 | Ryan | A45C 11/20 206/541 |
| 3,955,672 | A | * | 5/1976 | Brundage | A47G 19/065 206/218 |
| 4,075,769 | A | * | 2/1978 | Young | A47G 19/025 220/23.8 |

(Continued)

*Primary Examiner* — Andrew M Tecco
*Assistant Examiner* — Mobeen Ahmed
(74) *Attorney, Agent, or Firm* — Durham Jones & Pinegar, P.C.

(57) ABSTRACT

Trays for food are disclosed. A tray includes a plurality of receptacles, or compartments, for different courses of a meal (e.g., the entrée, a vegetable, a fruit, a starch, a dessert, a drink, etc.). Compartments for relatively unhealthful items may be configured to make the portion sizes of those items appear to be larger than they are, while compartments for healthful items may be configured to make the portion sizes of those items appear to be smaller than they are. The tray may also be configured to ensure that healthful items are positioned closest to an individual who is eating from the tray. Methods for presenting food to an individual are also disclosed.

25 Claims, 4 Drawing Sheets

(56) References Cited

U.S. PATENT DOCUMENTS

| | | | | |
|---|---|---|---|---|
| 4,081,646 A * | 3/1978 | Goltsos | A47G 23/06 | 219/729 |
| 4,534,469 A * | 8/1985 | Elsmo | A47G 19/06 | 206/217 |
| 4,562,926 A * | 1/1986 | Mode | A47G 23/06 | 206/218 |
| 4,838,444 A * | 6/1989 | Bitel | B65D 1/36 | 206/518 |
| 5,152,398 A * | 10/1992 | Forestal | A47G 19/065 | 206/561 |
| 5,184,750 A * | 2/1993 | Moller | A47G 19/06 | 206/562 |
| 5,954,561 A * | 9/1999 | Cannone | A63H 33/001 | 434/127 |
| 6,129,235 A * | 10/2000 | Creske | A47G 19/065 | 206/549 |
| 6,296,488 B1 * | 10/2001 | Brenkus | A47G 19/025 | 206/459.5 |
| 6,651,836 B1 * | 11/2003 | Hofheins | A47G 19/06 | 206/562 |
| 7,201,579 B1 * | 4/2007 | Boyum | G09B 19/0092 | 434/127 |
| 7,908,181 B2 * | 3/2011 | Dotson | G06Q 30/02 | 220/575 |
| 8,226,414 B2 * | 7/2012 | Bodin | G06F 19/3475 | 128/921 |
| D685,613 S * | 7/2013 | Baez | D7/553.1 | |
| 8,636,516 B2 * | 1/2014 | Batsikouras | G01G 19/4146 | 177/25.13 |
| 2001/0031449 A1 * | 10/2001 | Zwiers | G09B 23/28 | 434/127 |
| 2003/0006238 A1 * | 1/2003 | Iacovelli | B65D 1/36 | 220/575 |
| 2004/0040882 A1 * | 3/2004 | Hemingway | A47G 19/06 | 206/562 |
| 2006/0160050 A1 * | 7/2006 | Matson | G09B 19/0092 | 434/127 |
| 2006/0183086 A1 * | 8/2006 | Brandt | A47F 5/0043 | 434/127 |
| 2007/0059406 A1 * | 3/2007 | Shahsavarani | A23B 7/148 | 426/106 |
| 2008/0076096 A1 * | 3/2008 | Thomas | G09B 19/00 | 434/127 |
| 2008/0202977 A1 * | 8/2008 | Knudsen | B65D 1/36 | 206/561 |
| 2008/0217206 A1 * | 9/2008 | Shen | A47G 19/06 | 206/562 |
| 2008/0280278 A1 * | 11/2008 | Chu | G09B 19/0092 | 434/238 |
| 2009/0021058 A1 * | 1/2009 | Rajack | A47G 23/06 | 297/188.18 |
| 2009/0035734 A1 * | 2/2009 | Highet | G09B 19/0092 | 434/127 |
| 2009/0102123 A1 * | 4/2009 | Haas | A63F 3/0478 | 273/243 |
| 2009/0208917 A1 * | 8/2009 | Vinch | G09B 19/0092 | 434/430 |
| 2010/0279257 A1 * | 11/2010 | Sorensen | A23L 33/40 | 434/127 |
| 2010/0282760 A1 * | 11/2010 | Ebesu | A47G 19/06 | 220/574 |
| 2011/0020772 A1 * | 1/2011 | Carter | A47G 23/10 | 434/127 |
| 2011/0281245 A1 * | 11/2011 | Mansour | G09B 19/0092 | 434/127 |
| 2012/0074034 A1 * | 3/2012 | Bar | B65D 71/70 | 206/562 |
| 2012/0077154 A1 * | 3/2012 | Highet | A47G 19/025 | 434/127 |
| 2012/0135383 A1 * | 5/2012 | Jang | G09B 19/0092 | 434/127 |
| 2012/0135384 A1 * | 5/2012 | Nakao | A23L 33/30 | 434/127 |
| 2012/0171647 A1 * | 7/2012 | Samenuk | A47G 19/025 | 434/127 |
| 2012/0183933 A1 * | 7/2012 | Smiler | G09B 19/0092 | 434/127 |
| 2012/0270187 A1 * | 10/2012 | Minevitz | G09B 19/0092 | 434/127 |
| 2012/0325831 A1 * | 12/2012 | Wilmers | B65D 75/326 | 220/660 |
| 2013/0157232 A1 * | 6/2013 | Ehrenkranz | G01G 19/4146 | 434/127 |
| 2013/0203024 A1 * | 8/2013 | Dekar | B25J 11/008 | 434/127 |
| 2013/0236861 A1 * | 9/2013 | Wilmers | B65D 1/36 | 434/127 |
| 2013/0295530 A1 * | 11/2013 | Townsend | G09B 19/0092 | 434/127 |
| 2014/0004484 A1 * | 1/2014 | Austin-Stephens | G09B 19/0092 | 434/127 |
| 2014/0162221 A1 * | 6/2014 | Nwe | A23L 1/293 | 434/127 |
| 2014/0166669 A1 * | 6/2014 | Whyard | A47G 19/02 | 220/575 |
| 2014/0186805 A1 * | 7/2014 | Pordy | G09B 19/0092 | 434/127 |
| 2014/0199665 A1 * | 7/2014 | Tessema | A47F 10/06 | 434/127 |
| 2014/0255884 A1 * | 9/2014 | Highet | A23L 33/30 | 434/127 |
| 2014/0349257 A1 * | 11/2014 | Connor | A47G 21/02 | 434/127 |
| 2015/0108123 A1 * | 4/2015 | Linehan | A47D 3/00 | 220/17.1 |
| 2015/0289689 A1 * | 10/2015 | Verdirame | A47G 19/025 | 434/127 |
| 2016/0260352 A1 * | 9/2016 | Ortiz | G09B 19/0092 | |
| 2017/0021957 A1 * | 1/2017 | Gartz | B65D 1/36 | |

* cited by examiner

FOOD PRESENTATION METHODS

TECHNICAL FIELD

This disclosure relates generally to trays for food and, more specifically, to trays that include a plurality of receptacles, or compartments, for different courses of a meal (e.g., the entrée, a vegetable, a fruit, a starch, a dessert, a drink, etc.). Even more specifically, this disclosure relates to food trays that are configured to enable the development of better eating habits and to encourage individuals to consume greater amounts of foods that are nutritious and/or healthful than foods that are less nutritious and/or unhealthful.

BACKGROUND OF RELATED ART

Over 30 million children eat a government-subsidized lunch every day in the United States alone. Some children complain about portion sizes, but still waste food. Other children complain about the task and/or quality of the food and skip lunch altogether. Roughly half of these lunches are served off or reusable trays and half are served off of disposable Styrofoam trays or paper trays.

The food that school cafeterias serve to school children often is heavily skewed towards too many starchy and sweet dishes, and not enough vegetables or fruits. Moreover, soft drinks, which substantially add calories to a child's diet while providing little nutrition, are often consumed in favor of healthier beverages, like milk.

Childhood obesity has doubled since the early 1980's, and some have attributed this problem, in part, to the content of school lunches. About 75% of school aged children eat lunch provided by the cafeteria at their school. A typical school lunch accounts for a third of a student's daily caloric intake. Lunches provided by school cafeterias are estimated to add substantially more calories to a student's diet than lunches brought to school from home (e.g., bagged lunches, etc.). Over time, the accumulation of unhealthful eating choices, including those offered by typical school cafeteria lunches, could easily contribute to weight gain and obesity in children.

Although school lunch programs have substantial control over many aspects of their operations, including lunch content, choice mechanism, portion size, eating environment, price, payment, and extent of parental control, school lunch programs have primarily focused concerns on the content of lunches, rather than focusing on factors that may help children develop healthier eating habits.

Although the focus of the foregoing description is on school children, similar problems arise in any cafeteria setting for consumers of any age, including adults.

SUMMARY

A tray according to this disclosure is configured to present food in a manner that helps individuals eat healthfully. The configuration of the tray may provide a food server with guidance on appropriate presentation of various courses of a meal, as well as the portions, or serving sizes, that are to be provided to the individual who will consume the food. Additionally, the tray may present the food in a manner that makes healthier courses more enticing to the individual who consumes the food, and in a way that balances the individuals' expectations on portion sizes (e.g., larger portions of tasty foods, smaller portions of less tasty, but more healthful foods, etc.), with portion sizes that actually correspond to a healthy diet.

In one aspect, this disclosure relates to the tray itself, which may also be referred to herein as a "food tray" and as a "food tray apparatus." A tray according to this disclosure may be configured to present healthy courses of a meal (e.g., a vegetable, a fruit, etc.) at locations that are closest to an individual as he or she consumes the meal, while presenting less healthy courses (e.g., a dessert, a starch, etc.) at locations that are further away from the individual. In this regard, the tray may include compartments, or receptacles, for healthy courses adjacent to its front edge (e.g., at the side or sides of a compartment for an entrée, etc.), while compartments for less healthy courses are located towards the back edge of the tray.

In some embodiments, a tray may include one or more features that will encourage an individual to orient the tray in such a way that healthier courses are positioned closest to the individual. As an example, a tray may include a long, relatively deep compartment for napkins, utensils (or "eating ware") or the like adjacent to its rear edge. If such a compartment were positioned closest to an individual, it could impede the individual's access to other, food containing compartments of the tray. As such, the long, deep compartment may encourage an individual to orient the front and rear edges of the tray in their intended orientations (i.e., respectively, toward and away from the individual).

Other characteristics of the tray may also draw an individual's attention to compartments that hold healthier courses of a meal. Some non-limiting examples of such characteristics include the color of the tray, the use of images or other indicia at selected locations on the tray (e.g., adjacent to the openings of compartments that are intended to hold healthy courses, etc.) and other characteristics.

The compartments of a tray may have volumes that correspond to appropriate portion sizes for their respective courses of a meal. For example, compartments that are intended to hold healthy courses may have relatively large volumes, while compartments that are intended to hold less healthy courses may have relatively small volumes. The area of an opening of each compartment may correspond to an individual's expectations regarding portion sizes. In some embodiments, the area of the opening may suggest that the compartment has a larger volume than the compartment actually has. A compartment with a relatively small volume but an opening that is suggestive of a larger volume may be intended to hold an entrée or another course (e.g., a dessert, a starch, etc.) that may have a pleasing taste, but that might not be very healthy. Conversely, the area of an opening of a compartment of a tray may suggest to the individual that the compartment has a relatively small volume, while the actual volume of the compartment is larger than its opening would suggest. Such a compartment may be useful for holding a course that may not be particularly desirable to an individual (e.g., not flavorful, etc.), but would be healthy for the individual to consume. The shape of the opening of each compartment may provide an individual with similar cues as to compartment size (e.g., a compartment with a round opening may appear to have a small volume even though it does not, a compartment with a rectangular opening may appear to have a large volume even though it does not, etc.).

A tray according to this disclosure may include a compartment that is configured to hold a drink, but not other items of food. Such a compartment may include a base that will support a container for a drink, as well as a hole that may prevent the compartment from holding other items of food. In a specific embodiment, such a compartment may have a shape (e.g., rectangular, square, etc.) and dimensions that are suitable for receiving a single serving carton of milk, with a hole large enough to prevent the compartment from holding a can of an unhealthy beverage (e.g., a soft drink, an energy drink, etc.).

A tray according to this disclosure may be stackable with identical trays. In some embodiments, a shape and dimensions of the tray may enable it to be densely arranged with like trays in a dishwasher.

In another aspect, methods for presenting food to individuals who will consume the food are disclosed. In such a method, the food may be presented in a manner that position healthy courses (e.g., a vegetable, a fruit, etc.) at one or more locations closest to and, thus, readily accessible by an individual who will consume the food. Less healthful courses (e.g., desserts, starches, etc.) may be presented to the individual at locations that are further away from the individual and, thus, less accessible to the individual.

Food that is desirable to the individual (e.g., flavorful food, etc.), but may not be particularly healthful, may be presented in a manner that provides the appearance of a large portion size, but with an actual volume that corresponds to a more appropriate (i.e., smaller) portion size. Food that might be less desirable to the individual, but is healthful for the individual, may be presented in a manner that provides the appearance of a small portion size, but with an actual volume that corresponds to a more appropriate (i.e., larger) portion size.

Healthful courses of a meal may also be presented in a manner that improves their desirability, as perceived by an individual. As an example, a healthful course of vegetables may be presented on a tray (or a surrounding portion of a tray) that is yellow, gold or red in color, which may improve the perceived vibrancy of the color(s) of the vegetables.

Other aspects, as well as features and advantages of various aspects, of the disclosed subject matter will become apparent to those of ordinary skill in the art through consideration of the ensuing description, the accompanying drawings and the appended claims.

DETAILED DESCRIPTION

Figure 1:
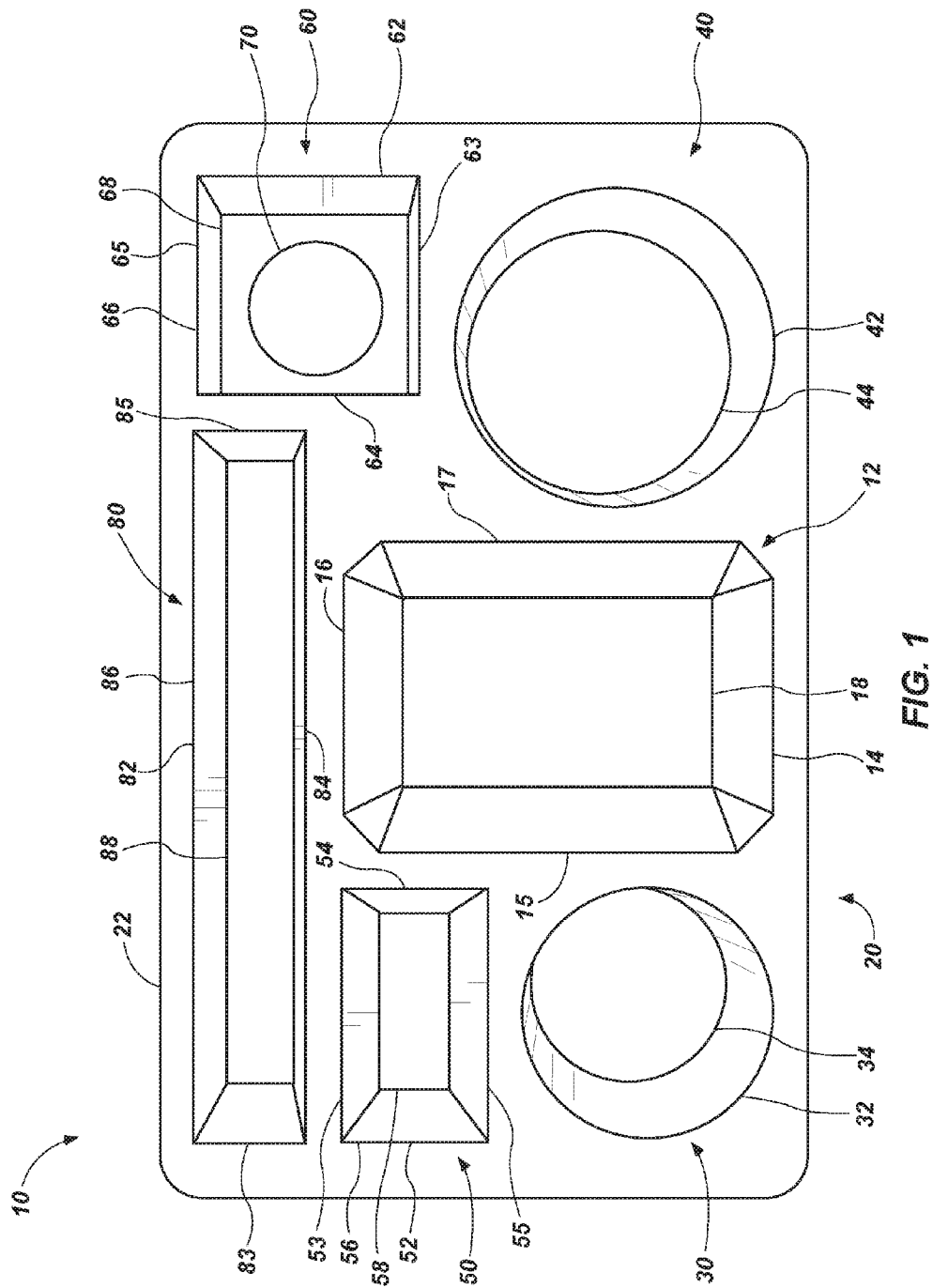
FIG. 1 is a top view of an embodiment of a tray for food according to this disclosure.

A survey shows that school children want to eat food that is fun or "cool," and like to eat bigger portions of food that tastes good than food that is healthy for them. At the same time, it is important to find a way for consumers to reduce portions of high calorie foods that are starchy and sweet, while increasing serving sizes for vegetables and fruit. With the foregoing in mind, this disclosure relates to tray that makes starchy entrées and sweet desserts look large and satisfying (at the same time being smaller than they appear) and vegetables and fruit appear to be smaller than they really are, while keeping the vegetable hot and the fruit cold.

Using principles of behavioral science, the tray of this disclosure was designed with several objectives. First, the tray displays the main entrée, which is usually starchy and typically has the most calories of all of the courses of a meal, so that it appears to be larger than it is. In addition, the tray is designed to make desserts appear to be less important but larger than they are, which may further reduce the serving size of a dessert, as well as the total calories of the meal. The tray may achieve these objectives by including one or more compartments that occupy a relatively large area of the tray while having a relatively shallow depths and, in some embodiments, shallowly beveled edges to reduce the overall volume and capacity of such compartments.

Additionally, a compartment for a dessert or a starchy food may have a configuration that is similar to, but smaller than, the configuration of the compartment for the entrée so the dessert or starch appears to be substantially larger than it actually is. In some embodiments, a compartment for a dessert or a starch may be placed towards the back of the tray so that the dessert appears to be less important than the other foods, or courses of a meal.

Furthermore, a tray may have a configuration, or design, that tends to make servings of vegetables and fruit appear to be smaller than they actually are, thus encouraging individuals to take more vegetables and fruit on the tray. The compartment(s) for vegetables and/or fruit may be deeper than the entrée and/or dessert compartments, enabling larger servings of vegetables and fruit. In some embodiments, the tray may be configured to receive a full cup of vegetables or fruit without the requirement of a separate bowl or cup.

The positioning of each compartment for vegetables and/or fruit may encourage an individual to consume these healthful types of food. For example, vegetable and/or fruit compartments may be positioned near the front edge of the tray, adjacent to the compartment for the entrée. This design may make the vegetables and/or fruit appear to be as central and important to a meal as the entrée. In some embodiments, a tray may include two compartments for vegetables and/or fruit, which may flank the compartment for an entrée. Such an arrangement may prevent an individual from having to choose between fruits and vegetables.

A tray according to this disclosure may have a color and/or include one or more icons that may be indicative of the intended contents of one or more corresponding compartments of the tray (e.g., vegetables and/or fruits, etc.) and/or that may encourage an individual to consume the more healthful courses of a meal, such as vegetables and/or fruits. Such an icon may be positioned within an container (on its bottom or one or more sides) and/or on a surface of the tray, adjacent to an opening of the container. In specific embodiments, a tray may be yellow, gold or red in color. Such colors are known to complement the appearance of many vegetables and fruits. In addition, such bright colors may enhance the appearance of the food and make it appear to be more fun. Translucence of the tray may also be used to enhance this effect. In some embodiments, various types of icons may be displayed in and around the vegetable and fruit compartments to encourage eating these foods. In a specific embodiment, one or more icons may provide a depiction of vegetables and/or fruits or a reminder that an individual should eat his or her vegetables and/or fruits.

The tray may also include a compartment with a shape that encourages an individual to consume a healthful beverage; for example, the tray may include a compartment that will receive a single serving carton of milk, but not other beverage containers. The compartment for a beverage may be shaped as a rectangle or a square so as to accommodate the rectangular or square shape of the base of a milk carton. In contrast, round cans or bottles of other beverages, such as soft drink cans, energy drink cans and the like, would fit awkwardly in such a compartment. In some embodiments a compartment for a beverage may include an opening through which a can or bottle with a round base could fall.

A tray according to this disclosure may be designed in a manner that reduces energy costs associated with cleaning a plurality of the trays.

Furthermore, most standard reusable food trays fit singly in a slot in an automatic dishwasher. The food trays of the current invention are reshaped to be longer and thinner than conventional trays so that two trays can be vertically stacked side by side and washed in one slot of the dishwasher instead of two slots. This new design saves in energy costs in cleaning the trays.

Referring to FIG. 1, an embodiment of a tray 10 according to this disclosure is shown in an overhead view. The tray 10 has a front edge 20 and a rear edge 22. The tray 10 is shown having several compartments 12, 30, 40, 50, 60, 80, etc., for food (e.g., various courses of a meal, etc.). The tray 10 may, in a very specific embodiment, be rectangular in shape and have dimensions of 9 inches by 14 ¾ inches.

A first compartment 12 of the tray may comprise a compartment for a main entrée (not shown). The first compartment 12 may be substantially rectangular in shape (e.g. rectangular with rounded edges, a roughly rectangular shape with curvilinear sides, etc.) with a longer dimension running perpendicular to the front edge 20 and the rear edge 22 (i.e., in a vertical direction) and a shorter dimension running parallel to the front edge 20 and the rear edge 22 (i.e., in a horizontal direction), thus leaving more room for a second compartment 30 and a third compartment 40 (e.g., compartments for vegetables and fruit, etc.) adjacent to, or near, the front edge 20 of the tray 10.

The sides 14, 15, 16 and 17 of the first compartment 12 may be shallowly beveled, as shown, to cut down on the size of the entrée while maintaining its large appearance. The first compartment 12 is shown as being positioned near the front edge 20 of the tray 10. In a very specific embodiment, the first compartment 12 may have an opening with a width of 4 ¼ inches that extends 6 inches from front to back. The beveled sides 14-17 may impart a base of the first compartment 12 with a bottom 18 that has a width of 2 ¹¹⁄₁₆ inches and that extends 4 ²⁹⁄₆₄ inches from front to back.

On the left side of the tray 10, near the front edge 20 and adjacent to the left side of the first compartment 12, is a second compartment 30 that may be used for containing a side dish, such as a fruit or another healthful side dish. As illustrated, an opening of the second compartment 30 may be circular in shape, and the second compartment 30 may have a cylindrical shape or a frustoconical shape. In a very specific embodiment, an opening at the top 32 of the second compartment 30 may have a diameter of 3 ½ inches, while a bottom 34 of the second compartment may have a diameter of 3 inches.

Another, third compartment 40 may be positioned adjacent to the front edge 20 of the tray 10 on the right side of the first compartment 12. The third compartment 40 may also be configured to receive a side dish (e.g., a healthful side dish, etc.). The third compartment 40 may be slightly larger and deeper than the second compartment 30 and, in some embodiments, may be configured to receive a full cup of vegetables. A depth of the third compartment 40 may help maintain a hot temperature of cooked vegetables. In a very specific embodiment, the third compartment 40 may have a diameter of 4 ½ inches at its top 42, narrowing down slightly to 4 inches at its bottom 44.

A smaller, fourth compartment 50 may be positioned in a less significant position on the tray 10, behind the second compartment 30. The fourth compartment 50 may be configured to receive a less healthy food, such as a starchy food or a dessert. The fourth compartment 50 may include side walls 52, 53, 54 and 55 that are shallowly beveled in such a way that an opening at a top 56 of the fourth compartment 50 imparts the fourth compartment 50 with the appearance of having a larger volume than it actually does. In a very specific embodiment, the dimensions at the top 56 of the second compartment may be 2 inches by 3 ½ inches, whereas the corresponding dimensions at the bottom 58 of the fourth compartment 50 may be 1 inch by 2 ½ inches. The fourth compartment 50 may have a depth that is as shallow as or shallower than the depth of the first compartment 12 so that the contents of the fourth compartment 50 appear to have a larger portion size than they actually have.

At a location adjacent to the rear edge 22 and, optionally, at a rear corner, the tray 10, may include a fifth compartment 60 that may be configured to accommodate a beverage. The fifth compartment 60 may be rectangular in shape and, in some embodiments, may be designed to receive the base of a small milk carton (not shown). In a very specific embodiment, a top 66 of the fifth compartment 60 may have dimensions of 2 ¾ inches by 2 ¾ inches. The sides 62, 63, 64 and 65 of the fifth compartment 60 may be beveled to slightly narrow down the bottom 68 of the fifth compartment 60 to dimensions of 3 inches by 3 inches. In some embodiments, the fifth compartment 60 may include a cut out portion, or an opening 70. The opening 70 may be configured (e.g., as a circle, as illustrated by FIG. 1) to discourage the placement of food or cans or bottles with circular bases in the fifth compartment 60.

Running along the rear edge 22 of the tray 10 is a sixth compartment 80, which may be elongated. The sixth compartment 80 may be configured to receive a napkin and/or utensils. The sixth compartment 80 may have beveled sides 82, 83, 84 and 85. In a very specific embodiment, the beveled sides 82-85 of the sixth compartment 80 may narrow the sixth compartment 80 down from dimensions of 1 ¾ inches by 9 ¾ inches at its top 86 to dimensions of 1 inch by 9 ¼ inches at its bottom 88.

Figure 2:
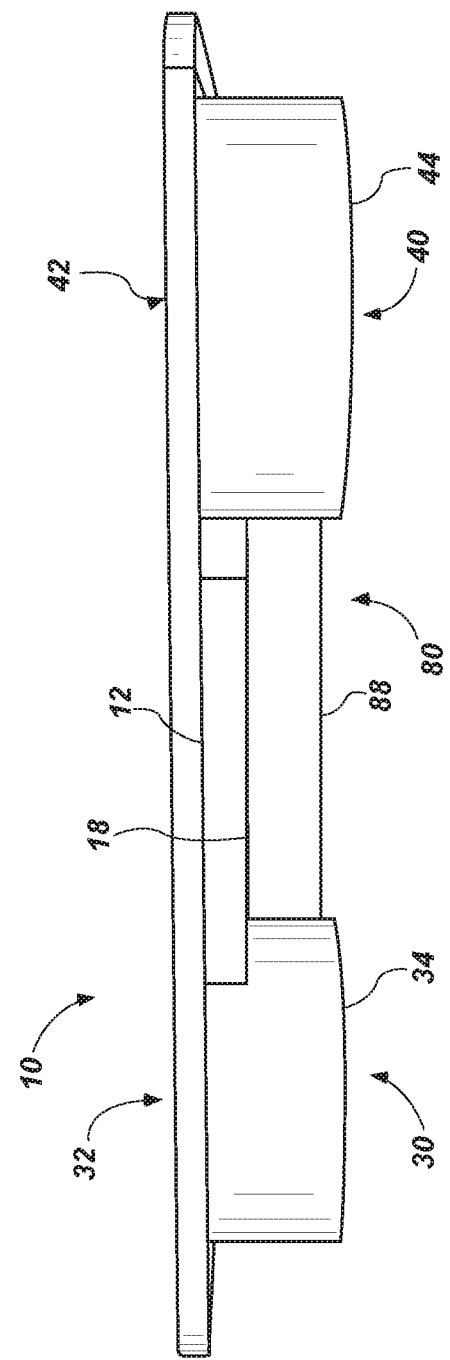
FIG. 2 is a front side, or edge, view of the embodiment of tray shown in FIG. 1.

Looking now at FIG. 2, a profile view of the tray 10 is shown from the front edge 20 of the tray 10. As shown, the second compartment 30 and the third compartment 40 may have depths that are considerably greater than the depths of the first compartment 12, the fourth compartment 50 and, optionally, the sixth compartment 80. In a very specific embodiment of the tray 10, the second compartment 30 and the third compartment 40 may have depths of 1 ½ inches. In contrast, the depths of the first compartment 12 and the fourth compartment 50 of such an embodiment may only be ½ inch or less.

Figure 3:
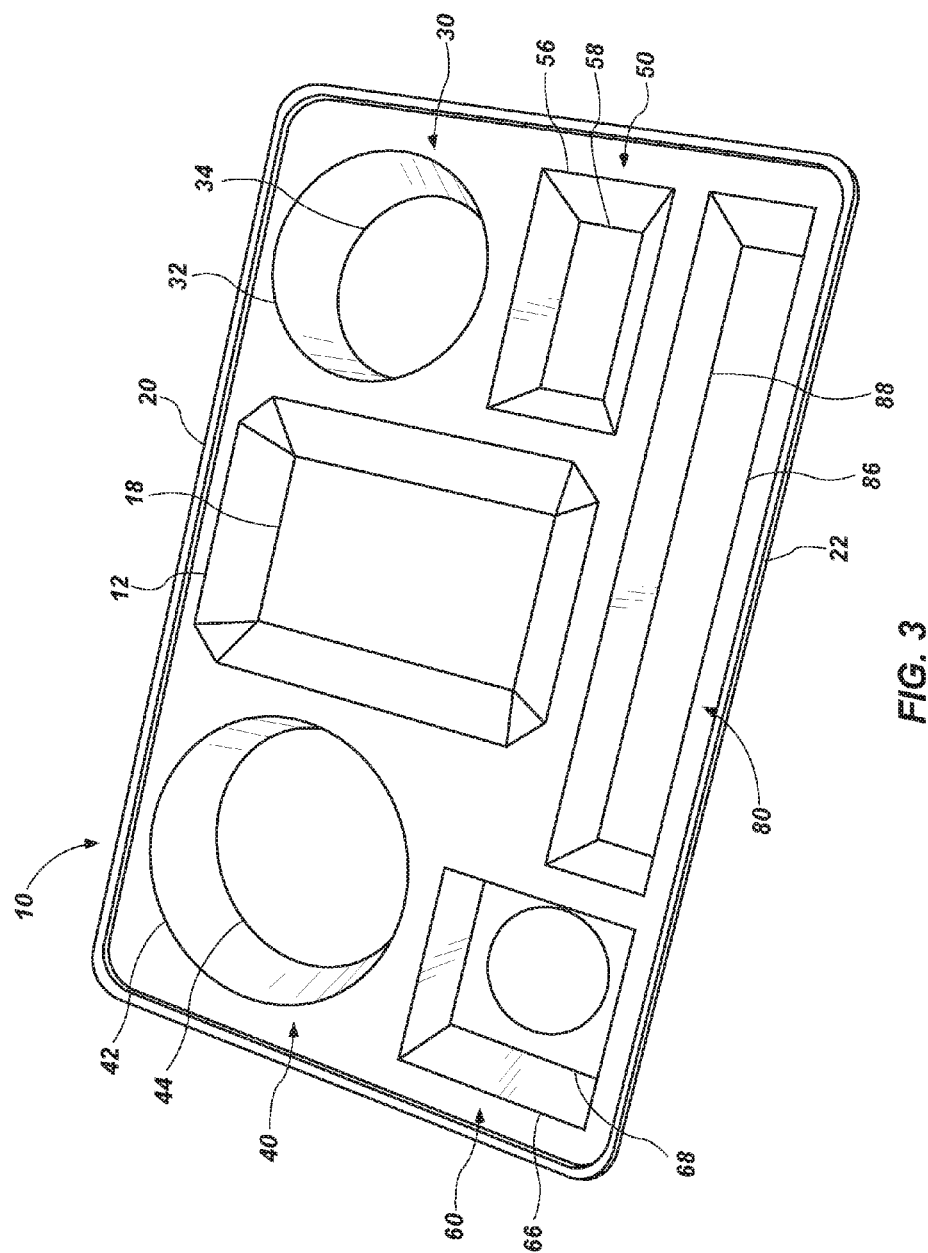
FIG. 3 is a perspective view of the tray shown in FIG. 1, from a location behind a rear edge of the tray.

Referring now to FIG. 3, a perspective view from the rear edge 22 of the tray 10 is shown. The dimensions of the embodiment shown in FIGS. 1 and 2 are maintained in the view provided by FIG. 3. Viewing the tray 10 form this backward orientation, the placement of the sixth compartment 80 tends to block access to the first compartment 12 (which may be intended for an entrée), as well as the second compartment 30 (which may be intended for fruit) and the third compartment 40 (which may be intended for a vegetable), causing the individual to turn the tray 10 around to the more desired position with the front edge 20 closest to the individual, as shown in FIG. 1.

Figure 4:
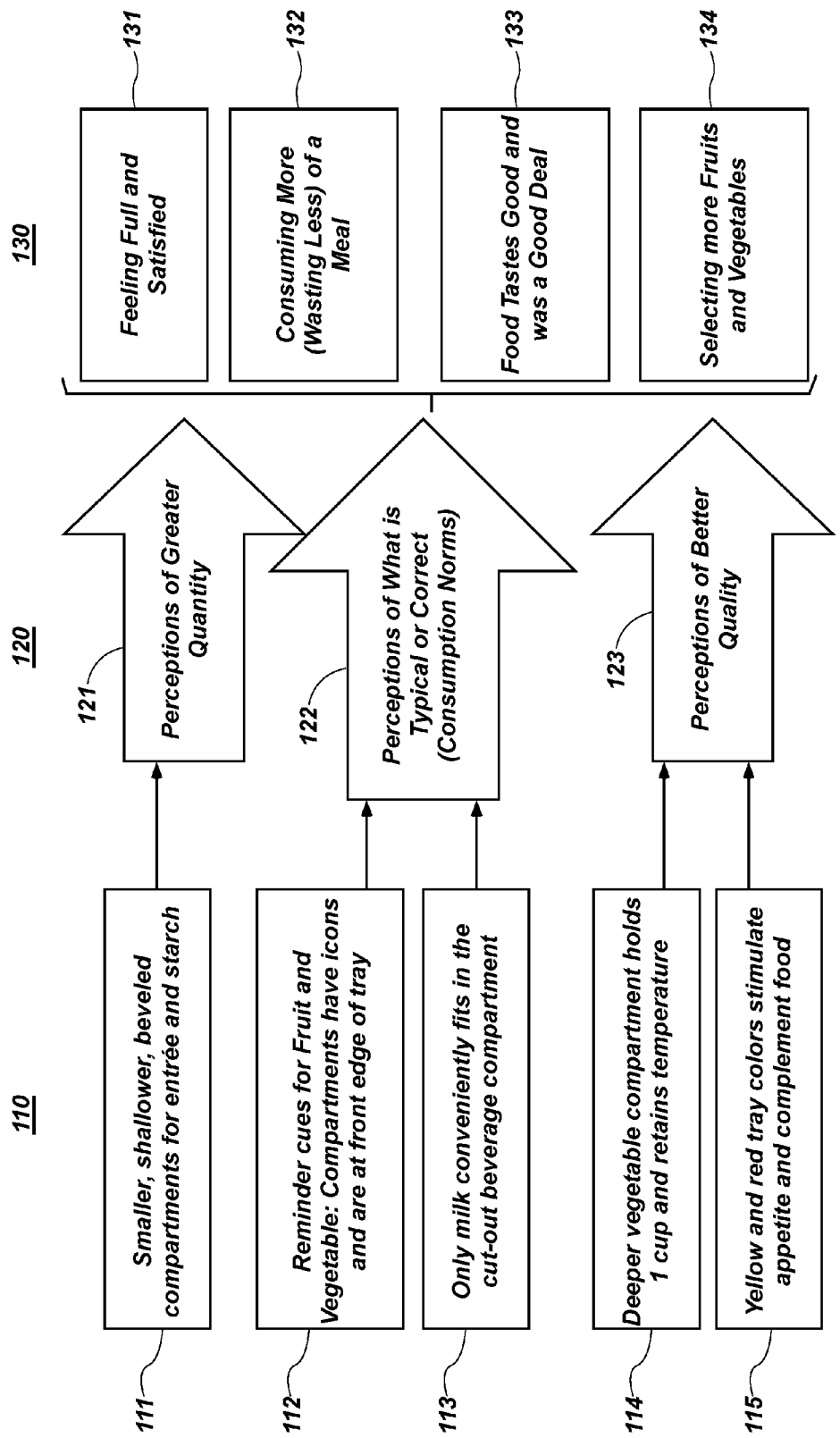
FIG. 4 is a diagram showing the features, perceptions and results of an embodiment of a tray according to this disclosure.

Referring now to FIG. 4, a diagram 100 is shown that highlights the advantages of various embodiments of a tray 10 (FIGS. 1-3) according to this disclosure. On the left side 110 of the diagram 100 are displayed the main features of the tray 10. In the center 120 of the diagram 100 are three arrows that indicate the perceptions that an individual, such a school child, might have as a result of the features of the tray 10 shown on the left side 110 of the diagram 100. On the right side 130 of the diagram 100 are four blocks that give the results that may come from the perceptions identified in the center 110 of the diagram 100.

Reviewing FIG. 4 in more detail, one feature 111 on the left side 110 of the diagram 100 shows that the smaller, shallower beveled first and fourth compartments 12 and 50 (FIG. 1) of the tray 10 (FIG. 1) are intended for an entrée and a dessert, respectively. The resulting perception 121 in the center 120 of the diagram 100 is that these compartments hold greater quantities of the entrée and the dessert than they actually hold.

Another feature 112 is that there are reminder cues for fruits and vegetables by placing the containers for fruits and vegetables in containers near the front of the tray 10 (e.g., the second container 20 and the third container 30 shown in FIG. 1) and possibly using icons to highlight these foods. The perception 122 at the center 120 of the diagram 100 indicates that it is normal and correct to place the compartments for fruits and vegetables in positions that are equally prominent with the compartment (e.g., the first container 12 shown in FIG. 1) that holds the entrée. The feature 113 that a milk container fits best in the beverage container (e.g., the fifth container shown in FIG. 1) gives a similar impression 122 that milk is the typical or correct choice for a beverage.

The feature 114 that the vegetable compartment is deeper and contains more vegetables and is more likely to keep them warm gives a perception 123 of better quality of the food. The feature 115 of coloring a tray in yellow, gold or red to stimulate the appetite may also give a perception 123 of better quality of food.

Looking at the results column at the right side 130 of the diagram 100, the three perceptions 121, 122 and 123 may achieve a result 131 that individual feels full and satisfied. In addition, these perceptions may result 132 in an individual consuming more and wasting less of a meal. Another possible result 133 is that the food tastes good and was a good deal for the individual. Another possible result 134 is that the individual is likely to select and consume more fruits and vegetables than he or she would have if the food was provided to the individual on a conventional tray.

A further result not shown in FIG. 4 is that a thinner tray 10 (FIG. 1) may enable two trays to fit in one slot in a dish washer, thus enabling more trays to be cleaned at the same time, thereby saving on energy costs associated with cleaning the trays 10.

Although the foregoing description contains many specifics, these should not be construed as limiting the scopes of the inventions recited by any of the appended claims, but merely as providing information pertinent to some specific embodiments that may fall within the scopes of the appended claims. Features from different embodiments may be employed in combination. In addition, other embodiments may also lie within the scopes of the appended claims. All additions to, deletions from and modifications of the disclosed subject matter that fall within the scopes of the claims are to be embraced by the claims.

What is claimed:

1. A method for presenting food to an individual using a tray having a plurality of compartments therein and having a front and a back, comprising:
    presenting the individual with the tray with:
        a first compartment of the tray capable of containing a first serving of food being located adjacent to an edge of the tray facing the individual, the first compartment having a first surface area and a first volume;
        a second compartment of the tray capable of containing a second serving of food being located adjacent to the edge of the tray facing the individual, the second compartment having a second surface area and a second volume, the second surface area being smaller than the first surface area and the second volume being larger than the first, volume; and
        a beverage compartment shaped to contain a carton of milk having a rectangular bottom, the beverage compartment having an opening therein to prevent placement of food or a cylindrical beverage container into the beverage compartment;
        the first surface area of the first compartment being larger than the second surface area of the second compartment to provide an appearance that the first serving of food arranged over the first surface area is larger than the second serving of food arranged over the second surface area.

2. The method of claim 1, wherein the first compartment and the second compartment are both disposed at the front of the tray, whereby the individual might readily place an entrée in the larger first compartment and a side dish in the smaller second compartment.

3. The method of claim 2, wherein presenting the individual with the tray further comprises presenting the individual with a tray with:
    a utensil compartment of the tray disposed at the back of the tray, the utensil compartment being configured to accommodate eating utensils rather than food, so as to hinder the individual's access to the front of the tray from the back of the tray.

4. The method of claim 1, wherein the first surface area of the first compartment is rectangular and the second surface area of the second compartment is circular.

5. The method of claim 4, wherein an edge of the rectangular first surface area is beveled to reduce the first volume.

6. The method of claim 1, wherein presenting the individual with the tray further comprises presenting the individual with a tray with:
    a third compartment located at the front of the tray, having a third surface area smaller than the first surface area of the first compartment and having a third depth, the third depth being greater than the first depth and a third volume greater than the first volume.

7. The method of claim 6, wherein presenting the individual with the tray further comprises presenting the individual with a tray with:
    a dessert compartment located between the first compartment and the back of the tray, the dessert compartment having a fourth depth less than the second depth and the third depth.

8. The method of claim 1, further comprising:
    placing an entrée in the first compartment of the tray; and
    placing a side dish in the second compartment of the tray, whereby the first surface area of the first compartment being larger than the surface area of the second compartment presents the appearance that the entrée has a larger portion size than the portion size of the side dish.

9. The method of claim 8, wherein the first compartment of the tray and the second compartment of the tray are both positioned at the front of the tray.

10. The method of claim 6, further comprising:
    placing an entrée in the first compartment of the tray;

placing a first side dish in the second compartment of the tray; and placing a second side dish in the third compartment of the tray, whereby the first surface area of the first compartment being larger than the second surface area of the second compartment and the third surface area of the third compartment presents the appearance that the entrée has a larger portion size than the portion size of the first side dish and the portion size of the second side dish, although the actual portion size of the first side dish and the actual portion size of the second side dish are both larger than the actual portion size of the entrée.

11. The method of claim 10, wherein the first compartment, second compartment and the third compartment are all disposed at the front of the tray.

12. The method of claim 11, wherein the first compartment is positioned between the second and the third compartments.

13. The method of claim 1, further comprising:

placing a carton of milk having a rectangular bottom in the beverage compartment.

14. The method of claim 13, further comprising:

placing a cylindrical can of beverage in the beverage compartment of the tray, the beverage compartment being unable to support the cylindrical can of beverage, the cylindrical can of beverage passing through the opening in the bottom of the beverage compartment.

15. The method of claim 1, wherein the tray is at least partially yellow, gold and/or red in color.

16. The method of claim 1, wherein the tray is at least partially translucent.

17. A method for presenting food to an individual, using a tray having a plurality of compartments and having a front and a back, comprising:

presenting an entrée compartment of the tray at the front of the tray, the entrée compartment having a first surface area and a first depth;

presenting a first side dish second compartment of the tray at the front of the tray adjacent to the entrée compartment, the first side dish compartment having a second surface area and a second depth;

presenting a second side dish compartment of the tray at the front of the tray adjacent to the écompartment, the second side dish compartment having a third surface area and a third depth; and presenting a beverage compartment of the tray shaped to contain a carton of milk having a rectangular bottom, the beverage compartment having an opening therein to prevent the placement of food or a cylindrical container in the beverage compartment.

18. The method of claim 17, wherein the first depth of the écompartment is less than the second depth of the first side dish compartment and the third depth of the second side dish compartment.

19. The method of claim 17, wherein the first surface area of the entrée compartment has a rectangular shape.

20. The method of claim 19, wherein the second surface area of the first side dish compartment has a circular shape.

21. The method of claim 20, wherein the third surface area of the second side dish compartment has a circular shape.

22. The method of claim 19, wherein the rectangular shape has a dimension running perpendicular to a front edge of the front of the tray that is longer than a dimension running parallel to the front edge.

23. The method of claim 19, wherein the sides of the rectangular surface are beveled.

24. The method of claim 17, further comprising presenting a dessert compartment of the tray between the entrée compartment and the back of the tray, the dessert tray having a fourth surface and a fourth depth.

25. The method of claim 24, wherein the fourth depth of the dessert compartment is less than the second depth of the first side dish compartment and less than the third depth of the second side dish compartment.

\* \* \* \* \*